United States Patent

Keskitalo

[15] 3,658,198
[45] Apr. 25, 1972

[54] LOADER BUCKET MOUNTING ASSEMBLY

[72] Inventor: Howard O. Keskitalo, Batavia, Ill.
[73] Assignee: Caterpillar Tractor Co., Peoria, Ill.
[22] Filed: Jan. 26, 1970
[21] Appl. No.: 5,733

[52] U.S. Cl. ............................................214/140, 214/775
[51] Int. Cl. ...........................................................B66f 9/00
[58] Field of Search..................214/778, 771, 779, 140, 131, 214/777, 766, 775

[56] References Cited

UNITED STATES PATENTS 3,526,329  9/1970  Anderson et al.........................214/140
2,718,318  9/1955  Schmucker et al......................214/766
3,529,740  9/1970  Chant......................................214/778

*Primary Examiner*—Gerald M. Forlenza
*Assistant Examiner*—John Mannix
*Attorney*—Fryer, Tjensvold, Feix, Phillips & Lempio

[57] ABSTRACT

A compact mounting assembly for supporting a bucket in closely adjacent relation to one end of a loader vehicle comprising a lift arm and a tilt motor being interconnected between each side of the bucket and pivot brackets formed on respective sides of the vehicular frame. A single hydraulic lift motor has its cylinder pivotally connected by means of a trunnion mounting to a cross member interconnected between the lift arms, its extendible rod being pivotally connected to a central portion of the vehicular frame assembly.

2 Claims, 3 Drawing Figures

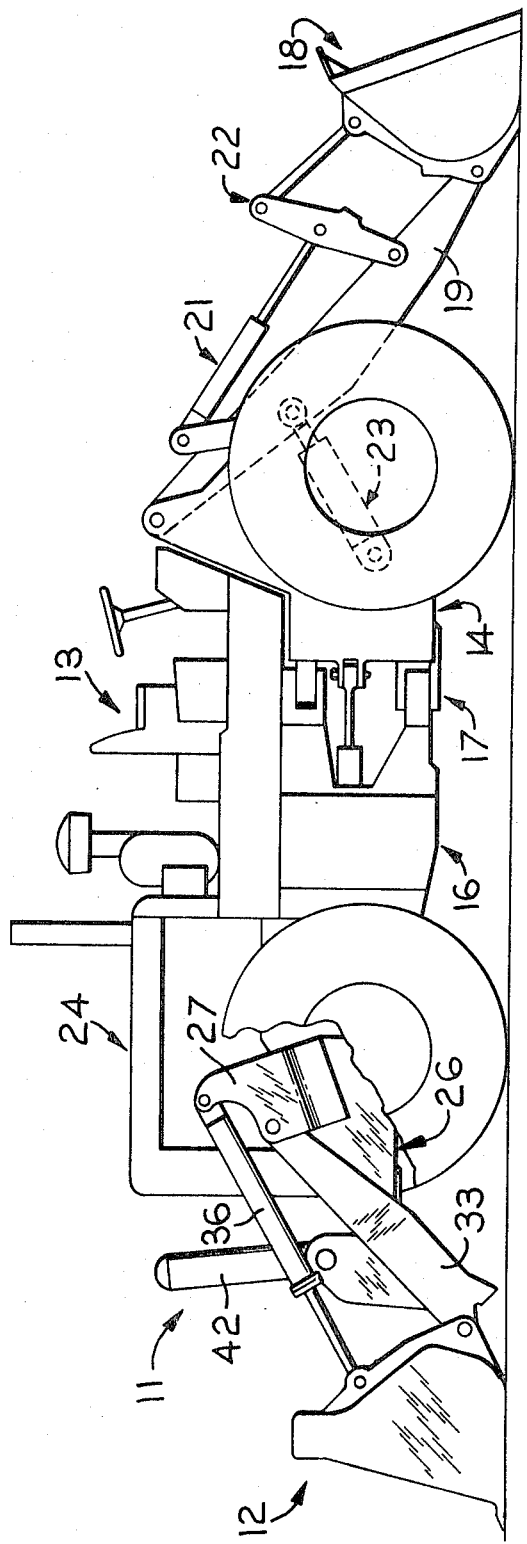

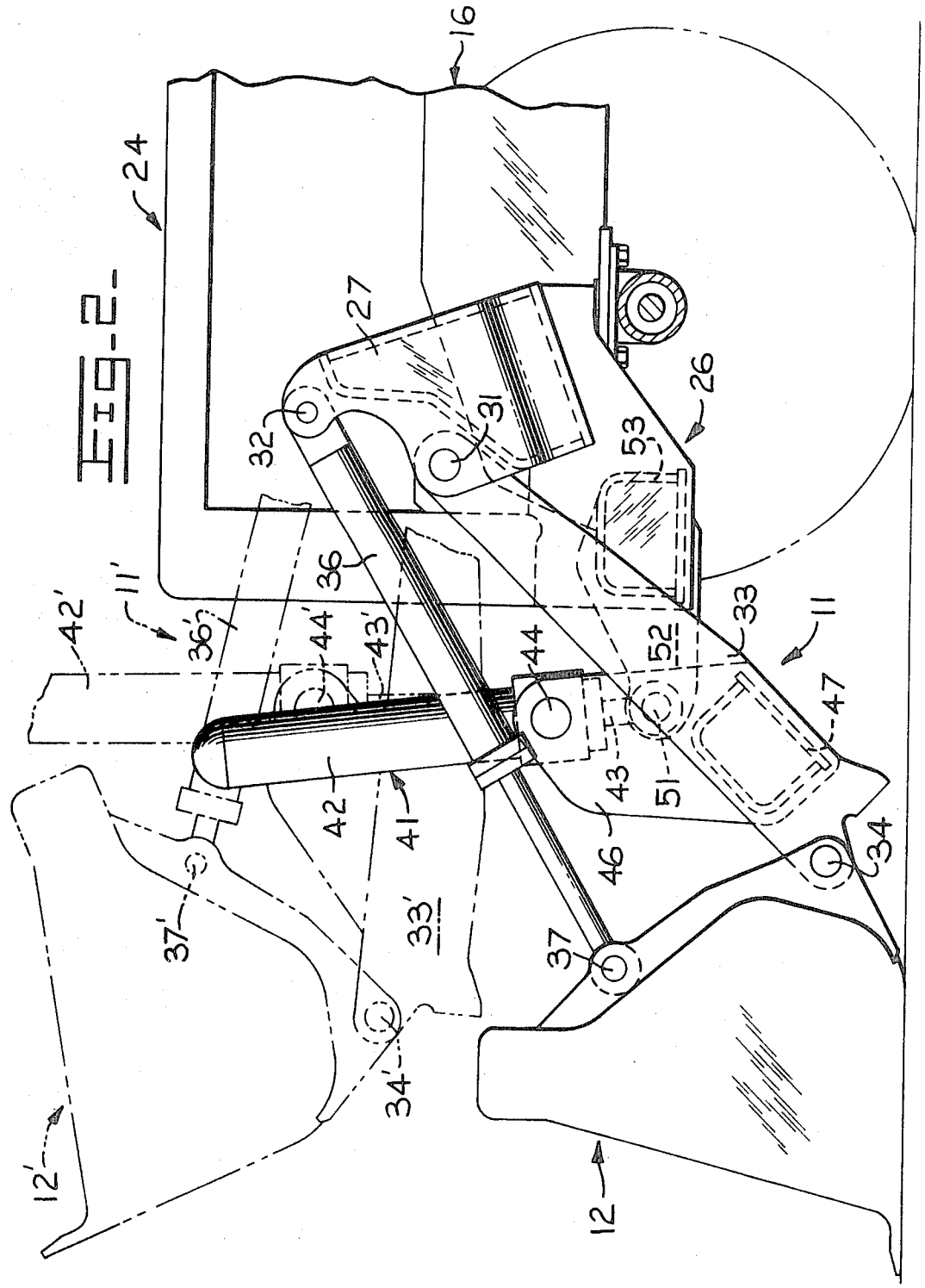

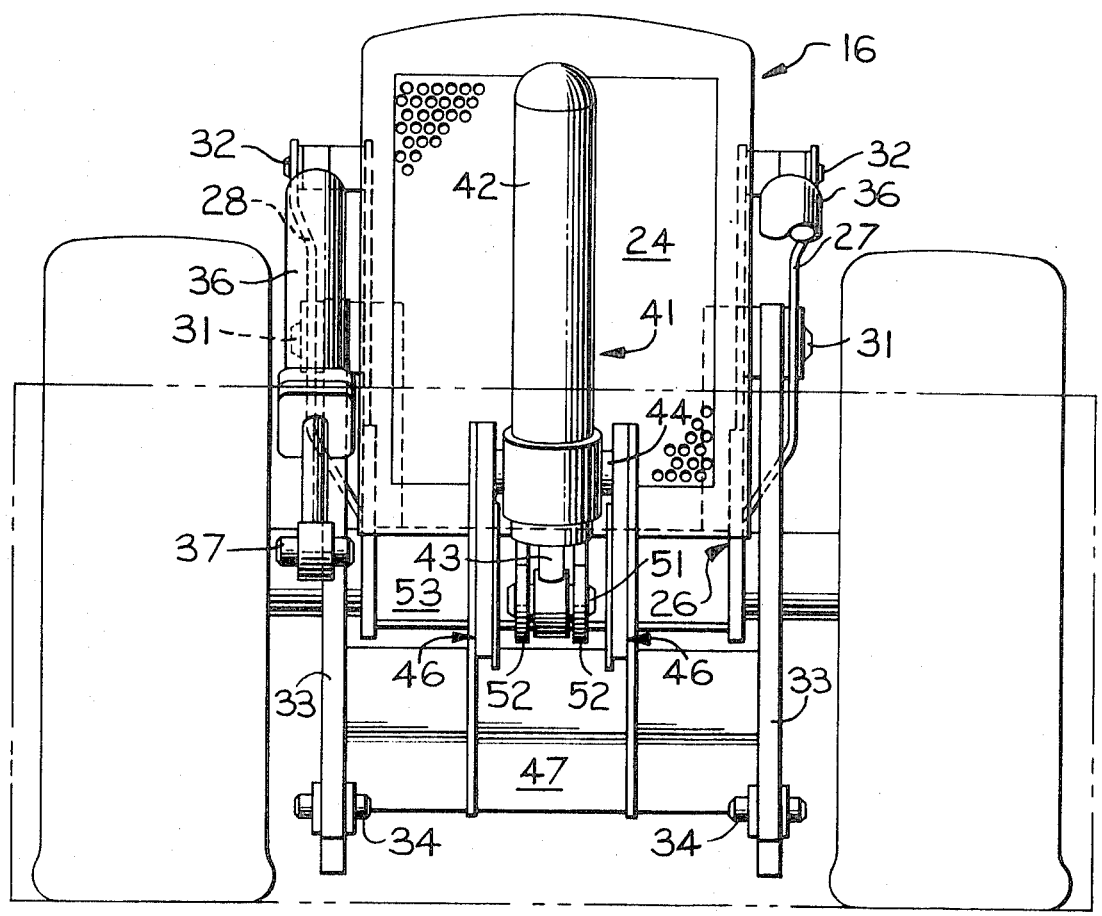

LOADER BUCKET MOUNTING ASSEMBLY

The present invention relates to a compact mounting assembly for supporting a bucket in closely adjacent relation to one end of a loader vehicle. The present invention is particularly contemplated for use with a loader vehicle of the type illustrated in the patent drawings and having a separate bucket assembly mounted at each end. With this arrangement, one bucket may be loaded during forward operation of the vehicle with the other bucket being loaded during reverse operation of the vehicle. The buckets may then be raised into balanced carry positions to facilitate transport operation of the vehicle. In addition to increasing the load capacity of the vehicle, the balanced positioning of the buckets tend to stabilize the vehicle during transport operation.

It is desirable to minimize the overall length of a vehicle of the type described above, for example, to increase stability as well as facilitating operation of the vehicle. The present invention therefore provides a mounting assembly capable of supporting an implement such as a loader bucket in closely adjacent relation to one end of the vehicle.

In addition to providing a mounting assembly as described above, it is a further object of the present invention to provide motor means for operating the implement or bucket with the motor means being unobstructed by the closely adjacent relation of the implement or bucket and one end of the vehicle.

Additional objects and advantages of the present invention are made apparent in the following description having reference to the accompanying drawings.

In the drawings:

FIG. 1 is a side view in elevation of a bucket loader vehicle upon which the present invention is particularly adaptable;

FIG. 2 is a fragmentary side view, with parts being shown in section, illustrating one end of the vehicle upon which a bucket assembly is supported by means of the present mounting assembly; and FIG. 3 is an end view of the loader vehicle taken from the left side of FIG. 2 with the loader bucket being removed to better illustrate the mounting assembly.

Having reference to the patent drawings and particularly to FIG. 1, the present invention provides a mounting assembly 11 for supporting an implement such as a loader bucket 12 in closely adjacent relation to one end of a vehicle 13.

As best illustrated in FIG. 1, the vehicle 13 includes articulated sections 14 and 16 secured together by means of an articulated pivot connection indicated at 17. A loader bucket 18 is supported upon the articulated section 14 by generally conventional means including a pair of lift arms, one of which is indicated at 19. A tilt motor 21 is interconnected between the bucket 18 and each of the lift arms 19 by means of tilt linkage indicated at 22. The bucket 18 may be raised or lowered upon its lift arms 19 by lift motor means indicated at 23.

In such vehicles, an engine or prime mover for the vehicle, as indicated at 24, is commonly mounted at the opposite end of the other articulated vehicular section 16. The present invention is particularly directed toward providing the compact mounting assembly 11 for supporting the bucket assembly 12 in closely adjacent relation to one end of the articulated section 16 and the engine 24.

Construction of the mounting assembly 11 may be best seen having reference to FIGS. 2 and 3. Referring now to FIGS. 2 and 3, the articulated section 16 has a main frame assembly generally indicated at 26. Brackets 27 and 28 are integrally secured to respective sides of the frame assembly 26, for example by welding. Each of the brackets 27 and 28 forms a first pivot connection 31 and a second pivot connection 32. A lift arm 33 is interconnected between each of the pivot connections 31 and a pivot 34 formed on the respective side of the loader bucket 12. A tilt motor or hydraulic cylinder 36 is also arranged between each of the pivot connections 32 and a pivot 37 formed on the respective side of the bucket assembly 12.

To raise and lower the bucket assembly 12 on its lift arms 33, a single lift motor or hydraulic cylinder 41 is centrally arranged within the mounting assembly 11. The lift motor 41 includes a cylinder 42 and an extendible rod 43. The cylinder 42 is secured at its rod end to the lift arms 33 by means of a trunnion connection 44 which provides a pivotal connection with both of the lift arms 33 by means of bifurcated brackets 46 and a cross member 47 which is rigidly interconnected between the lift arms 33. The rod 43 of the lift motor 41 is secured generally at the end of the main frame assembly 26 and the engine 24 by means of a pivot connection 51 formed on bifurcated brackets 52 which are centrally located on the vehicle and extend outwardly from a cross piece 53 which is an integral portion of the frame assembly 26.

Referring particularly to FIG. 2, the present mounting assembly permits the bucket assembly 12 to be supported in closely adjacent relation to the engine 24. In addition, the particular arrangement of the mounting assembly permits unobstructed operation of the tilt motors 36 and the lift motor 41 to properly position the bucket assembly 12 on its lift arms 33. For example, the bucket 12 may be raised and racked back from its solid line position to another position such as that illustrated with the bucket assembly 12 and mounting assembly being shown in phantom. The phantom position of the bucket and mounting assembly are indicated by similar primed numerals with the various components of the mounting assembly also being indicated by primed numerals. To move the bucket from its solid line position 12 to its phantom position 12', the tilt motors 36 are retracted, and the lift motor 42 is extended in order to raise the bucket assembly 12 on its lift arms 33 with respect to the central bracket 52. Because of the novel arrangement and interrelation for the various components of the mounting assembly 11, the bucket 12 may be moved to generally any desired position through operation of the tilt motors 36 and the lift motor 41 while avoiding interference between the components of the mounting assembly, the bucket 12 and the frame and engine of the vehicle.

What is claimed is:

1. An articulated loader vehicle having a bucket pivotally supported on one articulated section of the vehicle by a lift arm and an engine supported by a frame assembly on its other articulated section, an implement pivotally supported upon the other articulated section closely adjacent the engine by means of a mounting assembly comprising a pair of brackets fixed to the frame, and laterally displaced from and behind the front of the engine, lift arms pivotally connected to each bracket and the implement, a pair of tilt motors pivotally attached to the implement and the respective brackets, and a hydraulic lift motor for raising the implement on its lift arms, the lift motor including a cylinder and extensible rod, the cylinder being pivotally connected at its rod end by means of a trunnion mounting to a cross member interconnected with the lift arms, said frame assembly including a bracket centrally located at one end, and forward of the engine, said bracket being pivotally connected with the lift motor rod, said pivotal connections of said lift motor being generally vertically disposed, and the pivot connections for the tilt motors on the brackets being located upwardly and rearwardly of the pivot connections for the lift arms on the brackets.

2. The invention of claim 1 wherein the implement is a bucket.

* * * * *